US007007073B2

(12) United States Patent
Matous et al.

(10) Patent No.: US 7,007,073 B2
(45) Date of Patent: Feb. 28, 2006

(54) METHOD AND APPARATUS PROVIDING ELECTRONIC CONCURRENT DELIVERY OF MULTIMEDIA CONTENT TO GENERAL PURPOSE COMPUTERS OVER A COMPUTER NETWORK

(75) Inventors: Anthony G. Matous, Saltsburg, PA (US); Bruce A. Moser, Indiana, PA (US)

(73) Assignee: Learning Sciences International, Blairsville, PA (US)

( * ) Notice: Subject to any disclaimer, the term of this patent is extended or adjusted under 35 U.S.C. 154(b) by 732 days.

(21) Appl. No.: 09/875,750

(22) Filed: Jun. 6, 2001

(65) Prior Publication Data

US 2002/0188954 A1     Dec. 12, 2002

(51) Int. Cl.
*G06F 15/16*     (2006.01)
(52) U.S. Cl. ............... 709/217; 709/203; 709/219
(58) Field of Classification Search ............... 709/200, 709/217; 725/87
See application file for complete search history.

(56) References Cited

U.S. PATENT DOCUMENTS

| | | | | |
|---|---|---|---|---|
| 5,956,716 | A * | 9/1999 | Kenner et al. | 707/10 |
| 6,016,520 | A * | 1/2000 | Facq et al. | 710/33 |
| 6,170,014 | B1 * | 1/2001 | Darago et al. | 709/229 |
| 6,226,672 | B1 * | 5/2001 | DeMartin et al. | 709/219 |
| 6,269,394 | B1 * | 7/2001 | Kenner et al. | 709/217 |
| 6,343,319 | B1 * | 1/2002 | Abensour et al. | 709/219 |

OTHER PUBLICATIONS

Jorg Geibler, "Surfing the Movie Space: Advanced Navigation in Movie-Only Hypermedia." Nov. 5th, 1995. Proceedings of the third ACM international conference on Multimedia pp. 391-400.*

Janser, Achim. "An Interactive Learning System Visualizing Computer Graphics Algorithms." 1997. ACM Press, Proceedings of the 2nd conference on Integrating Technology into Computer Science Education, pp. 21-37.*

Oliver, Andrew. "What is Authorware?" Apr., 2000. http://www.herts.ac.uk/ltdu/technology/what_is_authorware.html.*

* cited by examiner

Primary Examiner—Rupal Dharia
Assistant Examiner—Nicholas R. Taylor
(74) Attorney, Agent, or Firm—Carothers and Carothers

(57) ABSTRACT

A method and apparatus for providing electronic concurrent delivery of multimedia content to general purpose computers over a computer network. A host computer having web server capabilities is coupled to a computer network and is provided with a storage medium which stores a database of multimedia experiences. The host computer is further provided with a management delivery system for managing the delivery of multimedia concepts from the host database for experiencing by a participant on a computer display device. A general purpose computer is coupled through the computer network to the host computer for downloading the delivery system over the computer network for managing the delivery of selected of the multimedia experiences from the host database to the general purpose computer for display on a computer display device. The delivery system is programmed for loading additional multimedia experiences from the host database into memory of the general purpose computer for subsequent experiencing while the participant is presently experiencing collected multimedia content from the host data base for providing seamless multimedia content display over a low bandwidth.

4 Claims, 4 Drawing Sheets

METHOD AND APPARATUS PROVIDING ELECTRONIC CONCURRENT DELIVERY OF MULTIMEDIA CONTENT TO GENERAL PURPOSE COMPUTERS OVER A COMPUTER NETWORK

FIELD OF THE INVENTION

This invention relates to a method and apparatus for providing online electronic concurrent delivery of multimedia content or interactive experiences to general purpose computers from a host computer over a computer network.

DEFINITION OF TERMS

1. General purpose computer—An individually owned or accessed computer which includes, but is not limited to, a central processing unit (CPU), random access memory (RAM), persistent storage media, an input/output adapter for connecting peripheral devices, a user interface adapter for connecting a keyboard, a mouse, speakers and/or other similar devices, and an interface to a telecommunication network.

2. Memory device—Random access memory and/or read only memory for a general purpose computer.

3. Display device—A video screen for a general purpose computer.

4. Network—A telecommunication network and/or the Internet or the global computer network.

5. Database—An information storage system, using relational structures and indexing to provide quick access to data.

6. Host computer—A computer system used by one hosting the interactive experiences that includes the additional functionality that permits it to operate as a web server.

7. Interactive experiences—Educational or game playing experiences that are personalized to the participating user.

8. Multithreading—Multiple processes being executed concurrently on one central processing unit.

9. Navigation capabilities—The capability of accessing desired or selected areas of the host computer database and/or website by a participant user, and to also include the ability to move from screen to screen within a delivered sequence of screens.

10. Storage medium—A device attached to a computer system that is capable of long or short-term storage of data and includes memory devices. The device stores or retrieves data as directed by the computer system.

11. Encoded—A transforming of information into binary code understandable or transferable by computer.

12. Machine-readable computer program code—Information encoded as defined in the previous definition.

13. Custom Delivery System (CDS)—The online component (such as a shell) that acts as a mediator between database information and the student or user.

14. Course Management Database—A database that tracks the user, system, course, sequence and screen information.

15. ColdFusion Script Pages—Scripts that provide further mediation between the user and the course management database, where Macromedia Flash action scripts are incapable of performing the necessary tasks.

16. Screens—Individually created Flash animation that convey one or more detailed concepts.

17. Movies—A series of linear frames that produce fluid content when viewed beginning to end at a relatively constant rate.

18. Sequences—A series of screens placed in order using the course management system of the present invention to convey a broader concept of that conveyed in an individual screen.

19. Course—A series of sequences placed in order using the course management system to convey a broader concept than that conveyed in an individual sequence.

20. Glossary terms and definitions—Terms and definitions pertaining to one or more courses. These are entered into the Course Management Database utilizing the course management system. The terms and definitions are then accessible by the Custom Delivery Shell and thus to the student.

21. Linkset—A set of http addresses pertaining to one or multiple courses. These are entered into the Course Management Database utilizing the course management system of the present invention. The http addresses are then accessible by the Custom Delivery Shell and thus to the student via the World Wide Web.

22. Index—A system of storage and retrieval that allows for random access to any one core component of data and includes bookmark capabilities.

23. Electronic Collaborative Communication—A means of communication where individuals discuss topics through electronic mediums ( e.g. Chat, Threaded Discussion, Flowing Discussion). A user's communications are visible to other individuals, thus allowing for a multi-person discussion other than dialog.

BACKGROUND OF THE INVENTION

Present day computer implemented methods and apparatus for providing experiences to remote user participants applying general purpose computers cannot provide delivery of online interactive experiences or multimedia content in a seamless display over a narrow bandwidth.

SUMMARY OF THE INVENTION

This specification describes the method and apparatus of the present invention for convenience only, in conjunction with a Course Delivery System. The Course Delivery System is described in a linear nature due to the non-expressive capabilities of the written word. The Course Delivery System, however, is concurrent and simultaneous in nature. The later detailed Initialization and Delivery Phases of the system occur concurrently, without regard to each other except where described. This ability to accomplish multiple activities at the same instance is what makes the system effective and unique.

The method and apparatus of the present invention provides electronic concurrent delivery of multimedia content to general purpose computers over a computer network in a narrow bandwidth. The host computer, which has web server capabilities, is coupled to the computer network and has a storage medium storing a database of multimedia experiences. The host computer is provided with a management delivery system for managing the delivery of multimedia content from the host database for experiencing by a participant on a computer display device.

One or more general purpose computers are coupled through the computer network to the host computer for downloading the delivery system for managing the delivery of selected multimedia experiences from the host database to a display device on the general purpose computer. This delivery system is programmed for loading additional multimedia experiences from the host database into the memory of this general purpose computer for subsequent experiencing while the participant is presently participating or experiencing selected multimedia content from the host database for providing seamless multimedia content display over a low bandwidth.

This custom delivery system was developed using software marketed under the trademark Macromedia Flash. This software is shipped with a very limited programming language called Action Script that was designed to give graphic artists the ability to control the flow of their animation. The present invention utilizes the features of Action Script well beyond its intended purpose.

In the method and apparatus of the present invention, the multimedia experiences are stored in the storage medium in the form of a movie clips that have and are controlled through the use of a timeline and a play head. Each timeline is subdivided into frames and each frame is broken down into a number of seconds. Only one play head is provided for each movie clip. Each play head is permitted to be on one instance of the timeline at any given moment whereby the play head moves forward based on the passing of time associated with each frame. This allows independent movie clips within the delivery shell to run concurrently with other movie clips and therefore share processor time slices.

BRIEF DESCRIPTION OF THE DRAWINGS

Other objects and advantages appear hereinafter in the following description and claims. The accompanying drawings show, for the purpose of exemplification, without limiting the invention or appended claims, certain practical embodiments of the present invention wherein:

DETAILED DESCRIPTION OF A PREFERRED EMBODIMENT

The present invention pertains to a method and apparatus for concurrent online delivery of interactive experiences or multimedia content to general purpose computers. While the method and apparatus of the present invention pertains to delivery of online multimedia content in general, this description of the preferred embodiment will be described in terms of a learning management system for delivery of learning experiences as the multimedia content.

Figure 1:
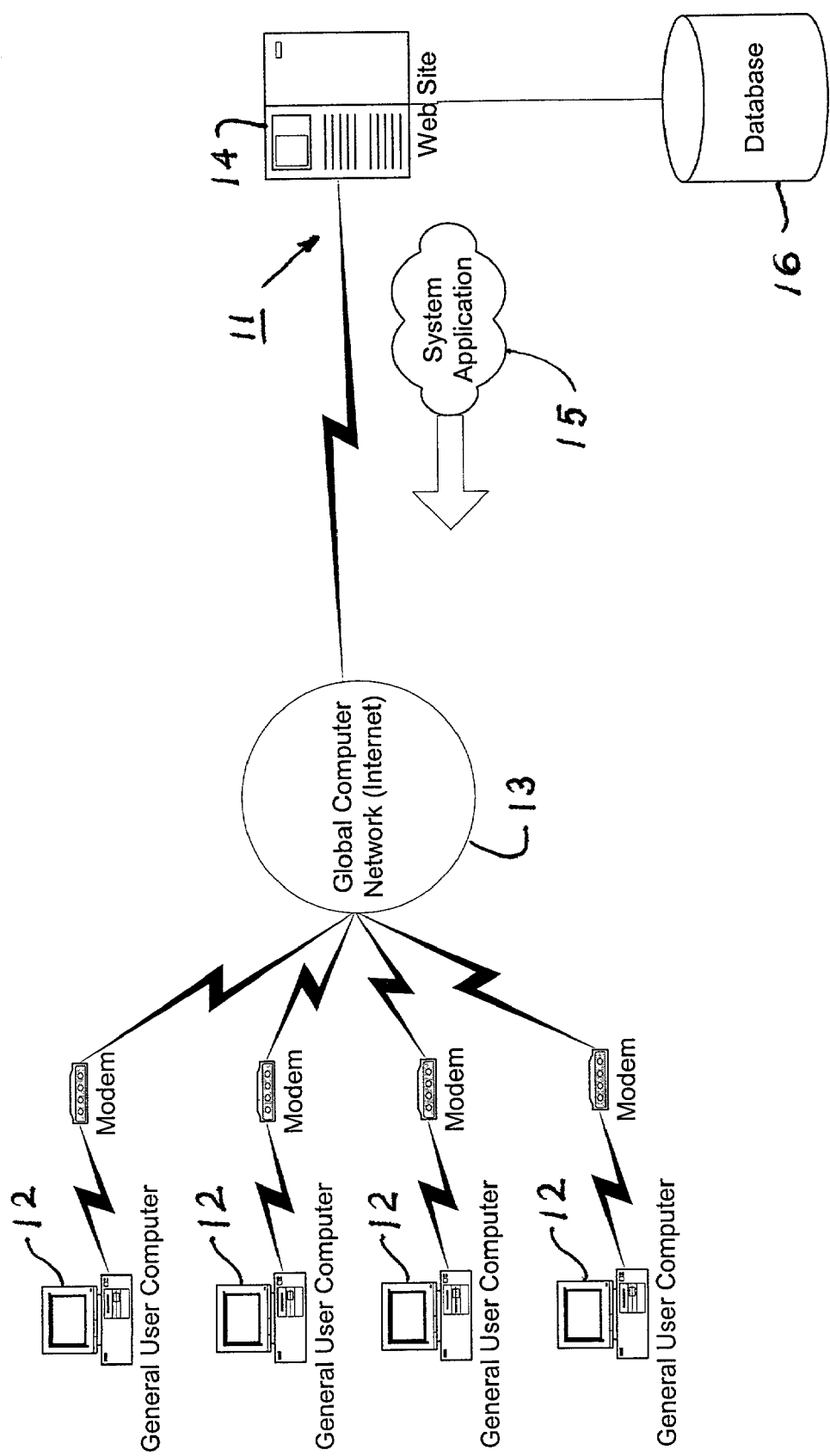
FIG. 1 is a schematic block diagram providing a diagrammatic overview of the computer system utilized to practice the method and apparatus of the present invention.

The learning management system is a computer based educational system that offers participant users or students an educational opportunity that is obtained online through a variety of different courses. FIG. 1 illustrates the main components of the learning system 10 that includes a host computer system 11 connected to multiple user general purpose computers 12 through the global computer network 13. A participant user may access the host computer system 11 on one of the general user computers 12 and thereby access the website 14 of the learning management system. From the website 14, the participant user may then access the different courses and other features of the host computer 11 wherein the user general purpose computer then retrieves and executes the Custom Delivery System (CDS) application 15.

By way of example, the general purpose computers 12 can be an IBM compatible personal computer, an Apple Macintosh computer, a UNIX based work station or any other similar type of general purpose computer. As explained in the definitions, the general user computers 12 include a central processing unit, random access memory, a persistent storage medium, and an interface to a telecommunication network shown here in the form of global computer network 13. The general user computers 12 will also have a resident operating system, such as, a Microsoft Windows based OS, MAC OS, UNIX OS or any other type of readily available operating system. In addition, the general user computers are also able to execute a computer based global computer network interface which is sometimes referred to as World Wide Web browser in order for the participant users to access the website 14 of the host computer system 11.

The host computer system 11 also uses a general purpose computer, but with additional functionality that permits it to operate as a web server. As a variation, the host computer system 11 can be in the form of several computers connected together to accomplish the functions and operations of the learning system of the present invention. For example, the web server functions can be executed on one computer that is then connected to another computer which executes the corresponding code for the website 14 and the CDS application 15, which in turn can be connected to a third computer that stores the information in a central database 16.

Figure 2:
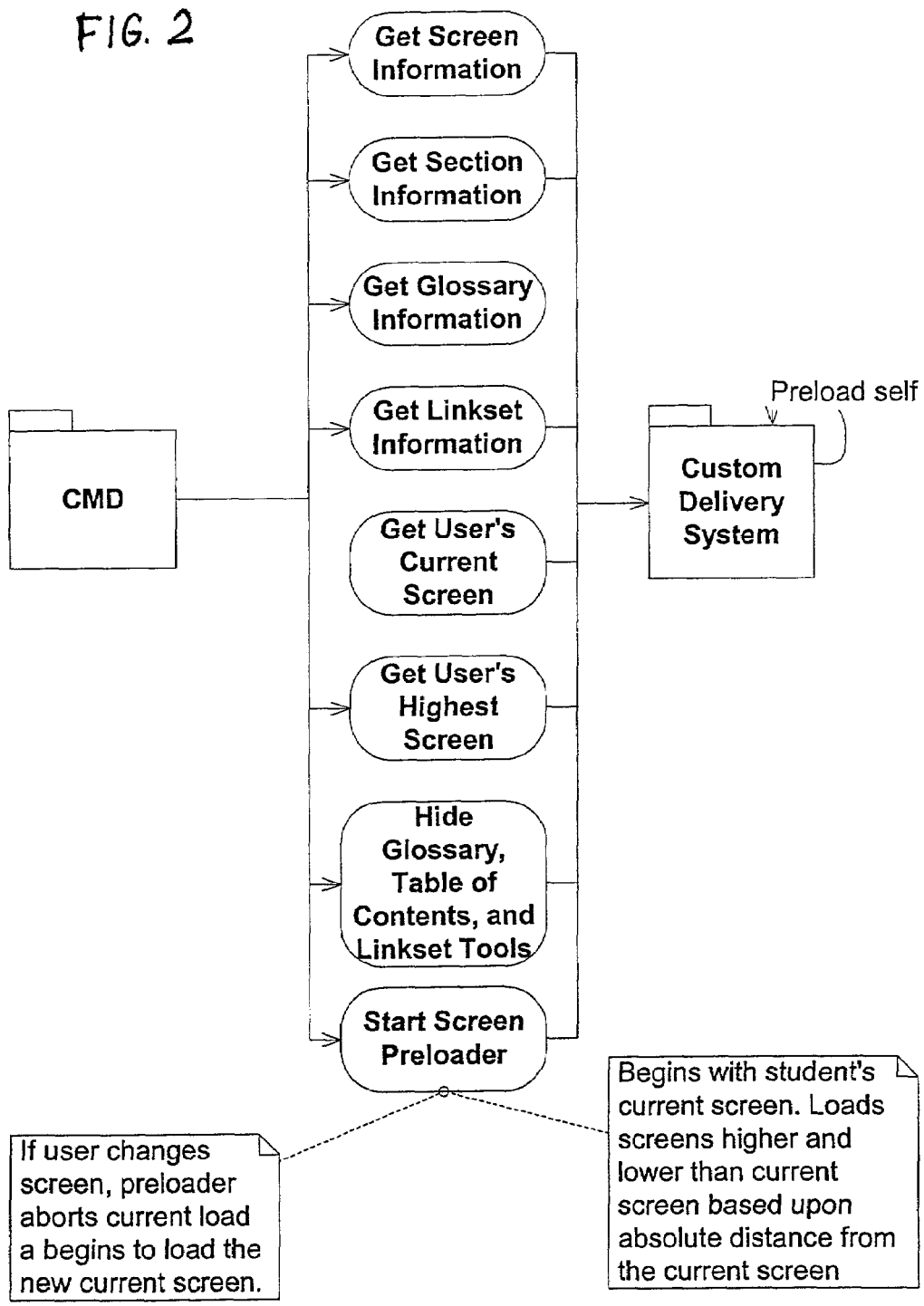
FIG. 2 is a flow chart illustrating the initialization procedure carried out in the host computer system which implements a self-directed online interactive course delivery system utilizing the teachings of the present invention.
Figure 3:
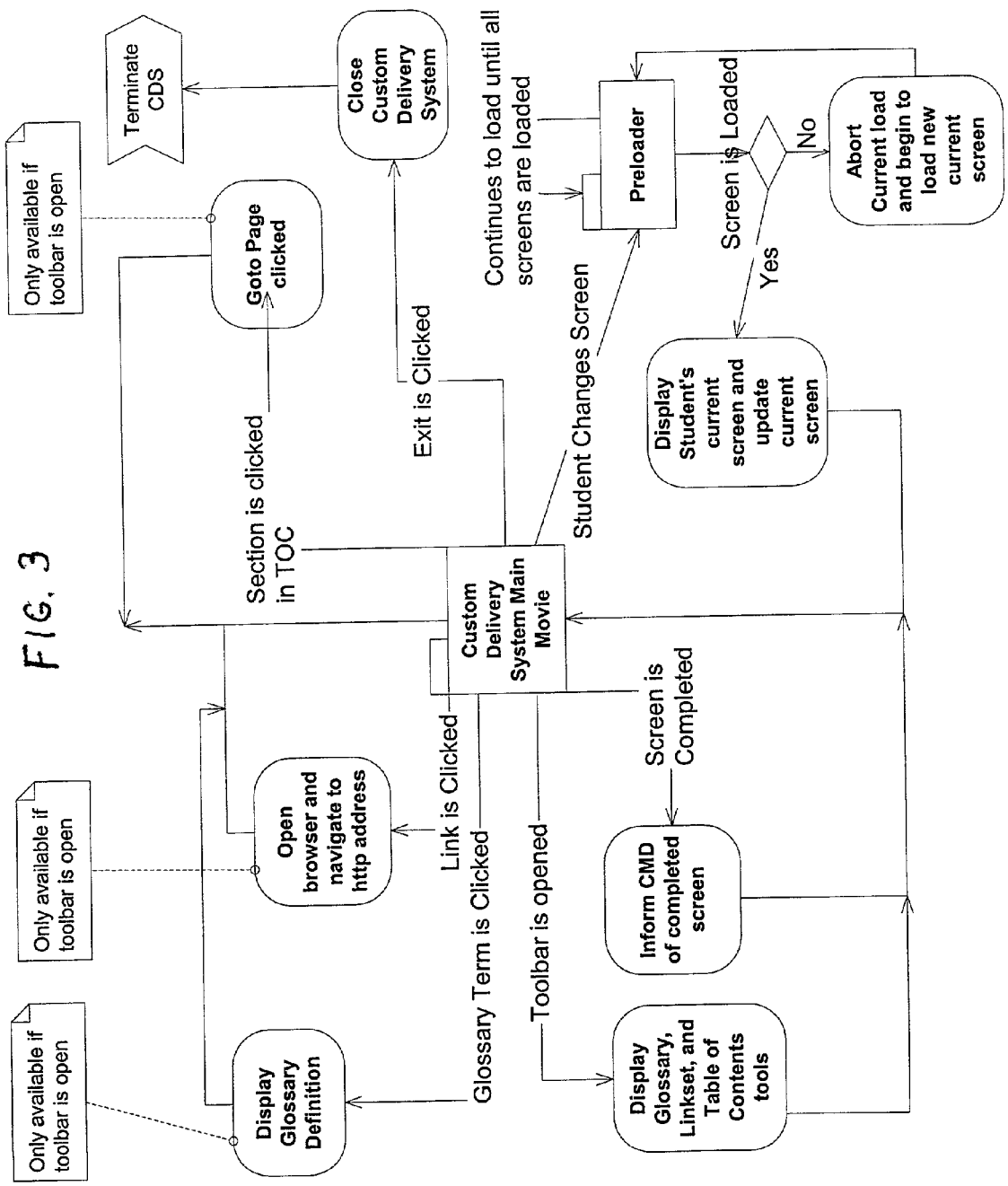
FIG. 3 is a flow chart illustrating the delivery mode procedure carried out in the host computer system illustrated in FIG. 1.
Figure 4:
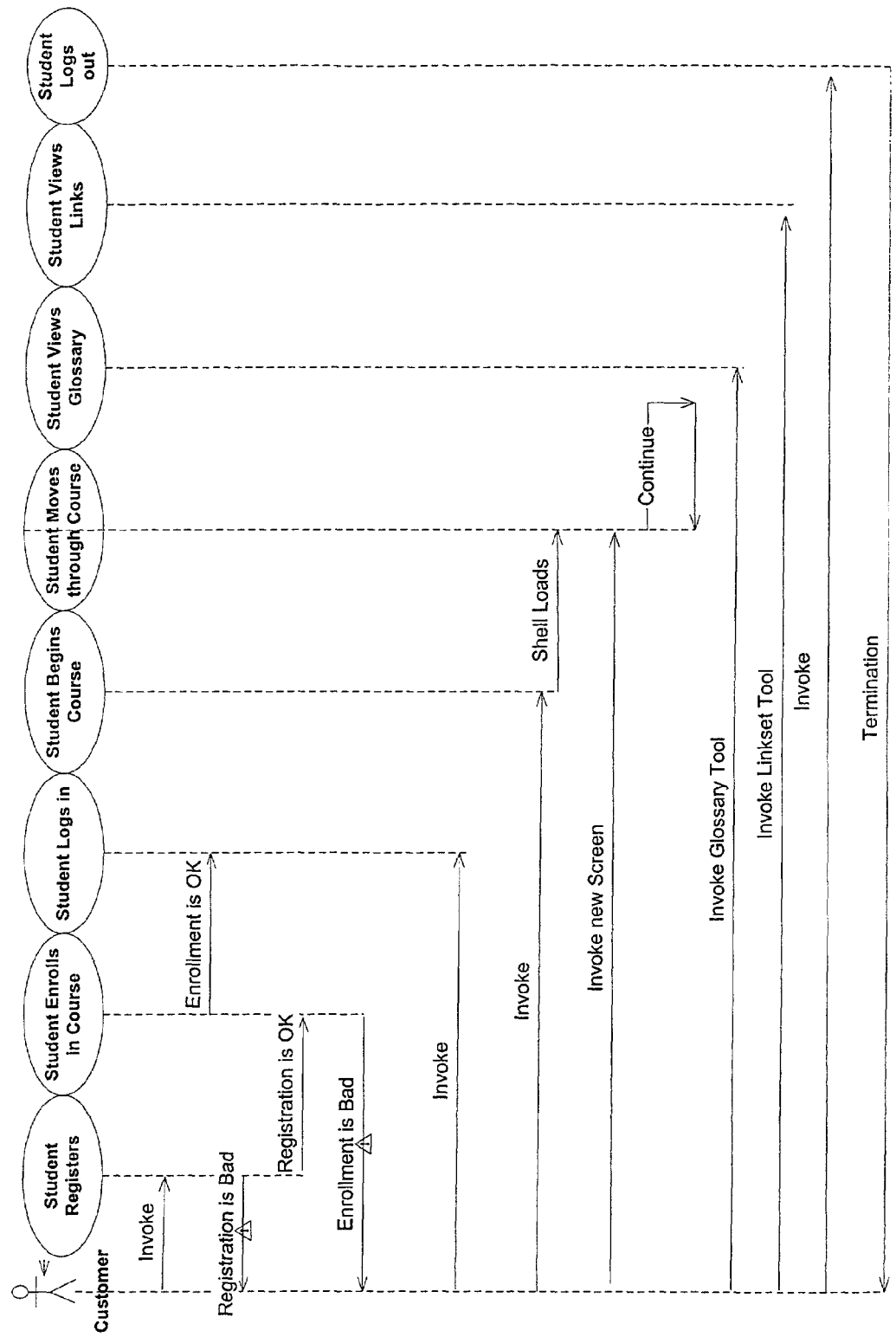
FIG. 4 is a life span flow chart illustrating the sequential steps carried out by the host computer system performing a computer implemented learning course delivery system utilizing the teachings and techniques of the present invention.

Access to the learning system is multithreaded for access of the database is provided whereby multiple participant user computers 12 may simultaneously access and participate in the dynamic stored interactive experiences. Broad navigation capabilities are provided in the host computer system 11 whereby a participant user may selectively navigate the host learning system, including the database 16. The host computer 11 is further programmed whereby a participant user may exit participation at any desired time and will be automatically returned to the place of termination upon re-accessing the website by the participant user for continued participation. The remaining FIGS. 2, 3 and 4 are flow charts that illustrate to a programmer of ordinary skill in the art how these and other hereinafter described features can be programmed into the host computer system 11.

There are three major tools used to create the online learning management system, a global computer network, such as the World Wide Web, a server-side scripting language that allows a global computer network server to create dynamically generated web pages, and thirdly, a tool for graphic artists to easily create vector-based tweened animation. These tools are used such that the sequences of screens can be combined with other similar sequences to create a robust online learning environment. The course is also designed and programmed to have the following technical characteristics:

1.—A shell or Custom Delivery System (CDS) that delivers the course requested by the user.
2.—The student may access any registered course at any time.
3.—The student may exit the course at any time.

4.—The course will track the last page viewed by the student.

5.—Upon reentry, the student will be returned to the page last viewed.

6.—The student may review any screen.

7.—The course is multithreaded whereby multiple students may simultaneously access the same course material.

Each screen will independently express one or more concise concepts. Sequences will consist of a series of the screens in such a way that a broader concept is relayed to the student. Finally, all the sequences merge to express the general subject being taught by the course.

In the preferred embodiment of the present invention being explained, the server-side scripting language that is employed in the system of the present invention in order to allow the host computer system to create dynamically generated web pages is a marketed program sold under the mark ColdFusion. ColdFusion is also used also to communicate with the Custom Delivery System. Flash is a tool designed for graphic artists to easily create vector-based tweened animation and for the design of the present invention. This tool is a program marketed under the mark Macromedia Flash.

As explained, the three major tools used to create the online system of the present invention are the global computer network, ColdFusion and Macromedia Flash. As explained, ColdFusion is the trademark for a server-side scripting language that allows a global computer network server to create dynamically generated web pages. ColdFusion is also used to communicate with the Macromedia Flash shell. This communication allows the programmer to deliver dynamic Flash content, tracking the use of Flash content, and providing Flash content in a way that the student is unaware that they are viewing small portions of Flash animation placed end to end.

Macromedia Flash is a trademark for a program designed as a tool for graphic artists to easily create vector-based tweened animation. Vector animation provides a high quality to low size ratio from which Flash gains its reputation. Tweened animation is the process wherein an artist creates key frames that denote changes in the animation and other subordinate artists fill in the tween frames ("in-between frames"). Flash takes on the role of the subordinate artist in that it creates the tween frames for animation. Flash was also provided with a very limited programming language called Action Script that was designed to give graphic artists the ability to control the flow of their animation. The present inventors utilize the features of Action Script well beyond its intended purpose. The result is an online learning system that will function such that any user regardless of platform may access and utilize the course material through a low bandwidth connection.

The Custom Delivery System (CDS) interacts with the host database to retrieve information, add information by interacting with ColdFusion scripts and to update information by interacting with ColdFusion scripts. The CDS also preloads all the movies associated with the course. This is done by loading screens as the student is viewing the current screen. The CDS also loads a series of glossary terms and definitions associated with the course and loads a set of http addresses associated with the course.

The host database further tracks the user's current position, tracks the user's highest obtained position, reports screen completion to the host database and allows the course to flow nonstop due to background loading of content.

Any one of these specifically named actions has been previously attempted in the prior art in Flash individually. However, a self-contained, fully dynamic, scalable Flash shell that simultaneously provides all of the above functions, has not been heretofore created and the present inventors thus utilize the Flash Action script well past its general expectations and purpose.

The CDS is a multimedia solution for delivering multimedia content such as images, animations, soundtrack, and voice over content, including narration, dialogue and other interpersonal communication, to the user over a low-bandwidth global computer network connection. Low-bandwidth is here defined as a typical modem connection of 28.8 K to 56K. However, the present invention also serves to deliver seamless multimedia content in a novel manner in broader bandwidths.

As previously explained, the CDS system exists in three phases, initialization, delivery and completion. The development of the CDS was accomplished using Macromedia Flash. Each phase is limitedly multithreaded by means of containing all or part of the code associated with the phase in a movie clip or clips. A movie clip is an individual existence of a movie. This concept is very similar to other object oriented languages in theory. For example, movie clips would correspond to threads, the timeline would correspond to the instruction stack of an individual thread, and the play head would correspond to the instruction pointer of an individual instruction stack. A movie clip has and is controlled through the use of a timeline and a play head. The timeline is sub-divided into frames and each frame can be broken down into a number of seconds. There is one and only one play head for each movie clip. This play head can be on play for only one instant of the timeline at any given moment. The play head moves forward dependant on the passing of time associated with each frame. By using the concept of multiple movie clips, each running with their own independent timeline and play head, the CDS is able to produce a multithreaded nature. This also allows completely independent parts of the CDS to run concurrently with each other and share processor time slices.

The initialization phase is the only independent phase within the CDS. It only requires that it be started by the interaction of the user. With this requirement met the CDS first begins by itself being downloaded into the memory of the user's machine. Once loaded the CDS begins by running the Main Movie. The Main Movie is the movie that controls all the other instances of movies. It also contains what is called the main timeline. The main timeline is where all movies must be present, directly or through inheritance, to exist. The Main Movie calls the Get Screen Settings Movie. The Get Screen Settings Movie requests the following information from the Host Database:

1. Screen information
    i. Name
    ii. Location
    iii. Number of Frames
2. Section information
    i. Beginning Screen
    ii. Ending Screen
    iii. Section Name
3. Glossary items
    i. Glossary Term
    ii. Term Definition
4. Linkset items
    i. Link name
    ii. Internet Address 5. User's current screen 6. User's highest screen reached The screen information is necessary so that the CDS can properly load the screen using the screen name and screen location from the host computer's memory. The CDS also uses the number of frames in a screen to allow for determination of screen completion, if so needed. The user's current screen is also important at this point because that is the individual screen which will be loaded first into the memory of the user's computer.

The section information is necessary so that the CDS can properly initialize the Table of Contents Movie with the section name and the screen number of the first screen in the section. The user's highest screen reached is then used to determine which sections may be capable of being navigated to within the Table of Contents Movie.

Glossary information is then loaded into the Glossary Movie and Linkset information is loaded into the Linkset Movie. Once the fore mentioned requests are completed the CDS initiates the Preload Movie and sets the visible state of the Glossary Movie, Table of Contents Movie, and Linkset Movie to false while at the same time loading the first screen and beginning the course. The Preload Movie loads a few screens concurrently while the Main Movie continues to move through the main timeline. The Preload Movie begins to load unloaded screens with the greatest absolute distance from the current screen. Once the Preload Movie begins the Preload Movie continues to load screens until all are loaded or until the user exits the CDS.

When the user's current screen is loaded, the CDS enters a mode concurrent to the preload mode in which it begins to deliver (delivery phase) the multimedia content to the user. The CDS does this by loading the user's current movie into the Play Movie. The Play Movie is a movie clip that allows the loaded movie to be viewed. The CDS also uses the Play Movie to track screen completion by determining if the user has accessed the last frame of the current movie. If the last frame has been reached, the Move Next Movie becomes enabled.

There is also a Move Previous Movie that is always enabled and allows the user to move to a previous screen. Oppositely the Move Next Movie allows the user to move to the next screen. In this way the CDS requires the user to view the entire movie before progressing. This required viewing time is spent idle by most web sites but the CDS takes advantage of this time, by loading the additional screens into memory via the Preload Movie. This is a very important aspect to the system and is the backbone, which allows the course content to be delivered in low bandwidth situations. By utilizing time spent by the user viewing-online content to load additional content into the memory of the user's computer, the CDS is able to provide seamless multimedia content to the user.

The CDS also continues to update the Host Database as the user proceeds through the course. Upon completion of every screen the CDS runs the Report Movie, which resets the user's current screen, and if applicable, the user's highest screen reached in the Host Database.

The delivery phase also allows the user to access tools on the toolbar. At any time during the content delivery a user can view glossary terms, visit other websites, or use the Table of Contents Movie to jump to another section previously viewed. When the user clicks the appropriate portions of the CDS, the visible state of the corresponding Movie is set to true. This enables the user to effectively utilize the entire workspace designated in the CDS without cluttering it with unnecessary tools.

There are ultimately two possible ends to the delivery phase:

1. The user clicks the exit button, which runs the Exit Movie. The exit movie does garbage collection (freeing memory) and closes the CDS window.

2. The user completes the course. Upon completion the CDS enters the completion phase.

When the user completes the multimedia portion of a course the CDS must update the Host Database by running the Completion Movie (the completion phase). The Completion Movie sends multimedia course completion information, resets the user's current screen, and resets the user's highest screen reached within the Host Database. The next time the user enters the site they will be able to review the course content via the methods described above.

We claim:

1. The method of providing electronic concurrent delivery of multimedia content to general purpose computers over a computer network, comprising:

storing a database of multimedia experiences in a storage medium of a host computer which is coupled to a computer network and has web server capabilities;

providing said host computer with a delivery system for managing the delivery of multimedia content from the host database for experiencing by a participant on a computer display device;

downloading the delivery system over the computer network into memory of a general purpose computer for managing the delivery of selected of said multimedia experiences from said host database to a general purpose computer for display on a computer display device;

loading additional multimedia experiences from said host database into memory of said general purpose computer for subsequent experiencing while the participant is presently experiencing selected multimedia content from the host database for providing seamless multimedia content display;

said multimedia experiences being stored in the storage medium in the form of movie clips which have and are controlled through the use of a timeline and a play head and each timeline is subdivided into frames and each frame is broken down into a number of seconds; the method including:

providing only one play head for each movie clip;

permitting each play head to be on for only one instant of the timeline at any given moment whereby the play head moves forward based on the passing of time associated with each frame and thereby allowing independent parts of the delivery system to run concurrently with each other and share processor time slices; and providing each movie clip with a programming language allowing the movie clip to control the flow of animation.

2. The method of claim 1, including programming said delivery system to obtain from the host database a set of glossary terms and website addresses associated with the multimedia experiences for download.

3. An apparatus for providing electronic concurrent delivery of multimedia content to general purpose computers over a computer network, comprising:

a host computer having web server capabilities and coupled to a computer network and having a storage medium storing a database of multimedia experiences;

said host computer provided with a delivery system for managing the delivery of multimedia content from the host database for experiencing by a participant on a computer display device;

a general purpose computer coupled through the computer network to the host computer for downloading the delivery system over the computer network for managing the delivery of selected of said multimedia experiences from said host database to a general purpose computer for display on a computer display device;

said delivery system being programmed for loading additional multimedia experiences from said host database into memory of said general purpose computer for subsequent experiencing while the participant is presently experiencing selected multimedia content from the host database for providing seamless multimedia content display;

said multimedia experiences being stored in the storage medium in the form of movie clips which have and are controlled through the use of a timeline and a play head and each timeline is subdivided into frames and each frame is broken down into a number of seconds, only one play head is provided for each movie clip, and each play head is permitted to be on for only one instant of the timeline at any given moment whereby the play head moves forward based on the passing of time associated with each frame and thereby allowing independent parts of the delivery shell to run concurrently with each other and share processor time slices; and said movie clips provided with a programming language allowing the movie clip to control the flow of animation.

4. The apparatus of claim 3, said delivery system programmed to obtain from the host database a set of glossary terms and website addresses associated with the multimedia experiences for download.

* * * * *